United States Patent
Subat et al.

(10) Patent No.: US 11,661,016 B2
(45) Date of Patent: May 30, 2023

(54) PRESSURE CONTROL IN EXTERNALLY DUCTED LOUDSPEAKERS

(71) Applicants: Dr. Ing. h.c. F. Porsche Aktiengesellschaft, Stuttgart (DE); Bose Corporation, Framingham, MA (US)

(72) Inventors: Bradford Kyle Subat, Northborough, MA (US); Tobe Z. Barksdale, Bolton, MA (US); Simon Bender, Kornwestheim (DE); Stephan Bayer, Leonberg (DE); Lorenz Kulf, Münsingen (DE)

(73) Assignees: Dr. Ing. h.c. F. Porsche Aktiengesellschaft; Bose Corporation, Framingham, MA (US)

( * ) Notice: Subject to any disclaimer, the term of this patent is extended or adjusted under 35 U.S.C. 154(b) by 0 days.

(21) Appl. No.: 17/831,720

(22) Filed: Jun. 3, 2022

(65) Prior Publication Data

US 2022/0289119 A1    Sep. 15, 2022

Related U.S. Application Data

(63) Continuation of application No. 16/532,927, filed on Aug. 6, 2019, now Pat. No. 11,377,041.

(51) Int. Cl.
| | |
|---|---|
| *B60R 11/02* | (2006.01) |
| *H04R 1/02* | (2006.01) |
| *H04R 9/06* | (2006.01) |

(52) U.S. Cl.
CPC .......... *B60R 11/0217* (2013.01); *H04R 1/025* (2013.01); *H04R 1/026* (2013.01); *H04R 9/06* (2013.01); *H04R 2499/13* (2013.01)

(58) Field of Classification Search
CPC ..... B60R 11/0217; H04R 1/025; H04R 1/026; H04R 9/06; H04R 2499/13
USPC .......................................................... 381/389
See application file for complete search history.

(56) References Cited

U.S. PATENT DOCUMENTS

| | | |
|---|---|---|
| 5,022,488 A | 6/1991 | House |
| 5,617,315 A | 4/1997 | Nakao et al. |
| 8,126,187 B2 | 2/2012 | Ludwig et al. |
| 9,591,388 B2 | 3/2017 | Tanabe |
| 10,235,985 B2 | 3/2019 | Christoph et al. |
| 10,419,837 B2 | 9/2019 | Timo et al. |
| 10,904,656 B2 | 1/2021 | Ludwig et al. |
| 2006/0050915 A1 | 3/2006 | Velican et al. |
| 2015/0030178 A1 | 1/2015 | Sulowski |
| 2018/0020290 A1 | 1/2018 | Ludwig et al. |
| 2018/0194298 A1 | 7/2018 | Tanabe |
| 2018/0242076 A1 | 8/2018 | Yerke et al. |

*Primary Examiner* — Sean H Nguyen
(74) *Attorney, Agent, or Firm* — RatnerPrestia

(57) ABSTRACT

A vehicle audio system includes a loudspeaker configured to be acoustically coupled to an interior of a vehicle and to be ducted to an exterior of the vehicle as well as a controller coupled to the loudspeaker. The controller is configured to (i) detect one or more vehicle operating parameters of the vehicle that would result in a pressure differential condition between the interior and the exterior, and (ii) adjust an audio signal provided to the loudspeaker in response to detecting the vehicle operating parameters.

18 Claims, 8 Drawing Sheets

PRESSURE CONTROL IN EXTERNALLY DUCTED LOUDSPEAKERS

TECHNICAL FIELD

This disclosure generally relates to vehicle audio systems. More particularly, the disclosure relates to a ducted vehicle loudspeaker.

BACKGROUND

The reproduction of low frequency sound in a vehicle can be difficult, mainly due to the need to generate significant levels of volume velocity, combined with the practical limitations of dimensions of the vehicle speaker system. Sealed enclosures generally require too much volume to be practical for good performance low frequency reproduction in a vehicular application. Similarly, conventional ported box structures may require significant enclosure dimensions to be large enough to obtain the desired output from the port, e.g., when ported to the interior of the vehicle. Coupling a loudspeaker to an exterior of the vehicle may provide a beneficial solution, e.g., acting as an infinite baffle, but there exists a need for protecting the loudspeaker from high pressure differentials between the outside atmosphere and inside the vehicle that may occur under various conditions. Such pressure differentials may cause poor performance of the loudspeaker system and, over time, may cause permanent damage to the loudspeaker, especially to the surround or suspension system of the loudspeaker.

SUMMARY

Aspects and examples are directed to loudspeaker systems that include an acoustic conduit configured to acoustically couple a sound-producing surface of an acoustic transducer (e.g., a loudspeaker) of a vehicle audio system through to a distal opening, mouth, or port that provides a duct to the outside of the vehicle. In various examples, the conduit may couple an interior loudspeaker to an exterior of the vehicle or may couple an exterior loudspeaker to an interior of the vehicle. Accordingly, under some conditions it may be possible that the loudspeaker is subjected to a pressure differential that may cause sub-optimal acoustic response of the loudspeaker and/or damage to the loudspeaker. Aspects and examples mitigate such conditions by adjusting an audio signal provided to the loudspeaker, which may include turning off the loudspeaker, and/or isolating the loudspeaker from the pressure differential, such as by an isolation valve that substantially closes off the external duct.

According to one aspect, an acoustic assembly is provided that includes an isolation valve configured, when actuated, to isolate at least one acoustically radiating portion of an acoustic transducer, when installed, from a pressure differential, and an actuator coupled to the isolation valve and configured to actuate the isolation valve.

Some examples include an acoustic conduit configured to couple the acoustic transducer, when installed, such that a first portion of radiating acoustic energy from the acoustic transducer is coupled to an interior of a vehicle and a second portion of radiating acoustic energy from the acoustic transducer is coupled to an exterior of the vehicle, when the isolation valve is not actuated. In certain examples, the first portion of radiating acoustic energy is radiated from a first side of a diaphragm of the acoustic transducer and the second portion of radiating acoustic energy is radiated from an opposing side of the diaphragm.

Various examples include a pressure equalizing component configured to equalize pressure between opposing sides of a diaphragm of the acoustic transducer when the isolation valve is actuated. The pressure equalizing component may be a pressure relief valve or a vent hole in certain examples.

Certain examples include a controller coupled to the actuator and configured to detect a pressure differential condition and to control the actuator to actuate the isolation valve in response to the detected condition. In some examples, the controller may be configured to detect the pressure differential condition by detecting one or more operating conditions of the vehicle, such as vehicle speed and/or the open or closed state of a window, sunroof, or other port. In some examples, the controller may be coupled to one or more sensors that may detect operating condition (s) and/or pressures.

According to another aspect, a loudspeaker assembly is provided that includes an acoustic conduit having a first opening configured to accommodate a loudspeaker, a second opening configured to acoustically couple to a region, and an interior volume between the first opening and the second opening and configured to provide acoustic coupling between the first opening and the second opening, the acoustic conduit further configured to be coupled to a vehicle such that the first opening is acoustically coupled to a selected one of an exterior or an interior of the vehicle and the second opening is acoustically coupled to the other of the exterior or the interior of the vehicle, a loudspeaker coupled to the first opening, and an isolation valve coupled to the acoustic conduit and configured to isolate the loudspeaker from the second opening when actuated.

Some examples include a pressure equalizing component configured to equalize pressure between opposing sides of the loudspeaker.

Various examples include a controller coupled to the isolation valve and configured to detect a pressure differential condition and to control the isolation valve based upon the detected condition. In some examples, the controller may be configured to detect the pressure differential condition by detecting one or more operating conditions of the vehicle. Such operating conditions may include vehicle speed and/or the open or closed state of a window, sunroof, or other port. In some examples, the controller may be coupled to one or more sensors that may detect operating condition(s) and/or pressures.

According to another aspect, a vehicle audio system is provided that includes a loudspeaker configured to be acoustically coupled to an interior of the vehicle and to be ducted to an exterior of the vehicle, and a controller coupled to the loudspeaker and configured to detect a condition that may cause at least one of an altered response of the loudspeaker or a risk of damage to the loudspeaker, and to adjust an audio signal provided to the loudspeaker in response to detecting the condition. In some examples, adjusting the audio signal may include reducing an amplitude of the audio signal, applying an equalization (EQ) to the audio signal, or ceasing to provide (e.g., turning off) the audio signal to the loudspeaker.

Some examples include an isolation valve configured to isolate the loudspeaker from a pressure differential when actuated, the controller may be configured to cause the isolation valve to be actuated in response to detecting the condition. Various examples may include a pressure equalizing component configured to equalize pressure between opposing sides of the loudspeaker, and in certain examples the pressure equalizing component may be a pressure relief valve or a vent hole.

According to various examples, the controller may be configured to detect the condition based upon one or more vehicle operating parameters. Such operating parameters may include vehicle speed and/or the open or closed state of a window, sunroof, or other port. In some examples, the controller may be coupled to one or more sensors that may detect operating parameter(s) and/or pressures.

In certain examples, the condition is a pressure differential condition.

According to another aspect, a vehicle is provided that includes a body panel having a partition that separates an interior space from an exterior space, an acoustic conduit coupled to the body panel and defining an acoustic volume that acoustically couples the interior space to the exterior space, the acoustic conduit having a first opening that acoustically couples to a selected one of the interior space or the exterior space and an opposing opening configured to accommodate a loudspeaker acoustically coupled to the other of the interior space or the exterior space, a loudspeaker coupled to the acoustic conduit at the opposing opening, the loudspeaker being acoustically coupled to the acoustic conduit at a first portion of a radiating surface and being acoustically coupled to the other of the interior space or the exterior space at a second portion of a radiating surface, and a controller coupled to the loudspeaker and configured to detect a condition that may cause at least one of an altered response of the loudspeaker or a risk of damage to the loudspeaker, and to adjust an audio signal provided to the loudspeaker in response to detecting the condition.

Certain examples may include an isolation valve coupled to the controller and configured to isolate the loudspeaker from a pressure differential existing between the interior space and the exterior space, the controller further configured to actuate the isolation valve in response to detecting the condition.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Figure 1A:
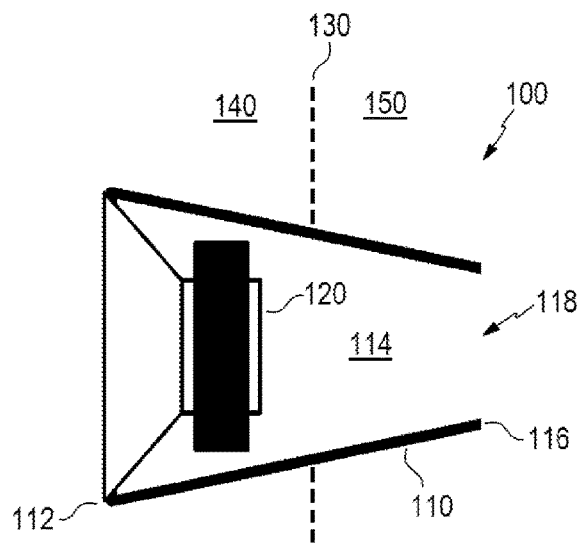
FIGS. 1A-1C are schematic diagrams of an example loudspeaker assembly in various positions relative to a vehicle partition.

Aspects of the present disclosure are directed to one or more loudspeaker assemblies for use in vehicular audio systems, and vehicular audio systems including such a loudspeaker assembly. Aspects and examples disclosed herein provide protection of an acoustic transducer (e.g., a loudspeaker) from a pressure differential that may arise under various operating conditions of the vehicle.

For example, a high vehicle speed may result in a high pressure differential between the interior (e.g., front) side of the loudspeaker and the exterior (e.g., back) side of the loudspeaker. Such pressure differentials may arise due to a venturi effect, for instance, and or may arise due to a high vehicle speed in combination with other openings—such as an open or partially opened window, sunroof, and/or other port to the exterior, for example.

In various operating conditions, such a pressure differential may cause moving parts of the loudspeaker, e.g., a diaphragm, to have a static bias such as a substantial excursion toward the front or rear (depending upon the direction of pressure differential and orientation of the loudspeaker). Such an excursion in response to a pressure differential is not related to an audio signal applied to the loudspeaker. Further, the loudspeaker may produce undesirable acoustic effects under such conditions when in use to reproduce audio content. Further, in various examples, an extreme excursion or an excursion existing for an extended period of time, may stretch and/or permanently damage a suspension structure of the loudspeaker.

Accordingly, with respect to various examples described herein, various means of sensing a pressure differential may be provided. For example, various sensors may detect one or more pressures (e.g., static, absolute, differential) such as around the loudspeaker or in the acoustic conduit, in the interior of the vehicle, and/or the exterior of the vehicle. In some examples, one or more vehicle operating conditions that may give rise to a pressure differential may be detected. In some examples, an amplifier or other component may sense an altered response of the loudspeaker that may be indicative of the loudspeaker subjected to a differential pressure. For example, an additional deflection of a loudspeaker diaphragm caused by a pressure differential may cause an altered impedance, which may be detected by sensing a voltage and current relationship in the signal provided to the loudspeaker. In further examples, any combination of detecting pressure(s), vehicle operating condition(s), and/or loudspeaker signal responses may detect a pressure differential and/or conditions that give rise to a developing pressure differential.

In response to detecting a pressure differential and/or a developing pressure differential, a mitigating action may be taken by various examples described herein. In various examples, an audio signal processing may be applied to adjust the response of the loudspeaker. Responses of other speakers may also be adjusted to accommodate the change in response of an audio system overall. In some examples, a direct current bias may be added to a signal provided to the loudspeaker, configured to counteract a bias deflection of the loudspeaker diaphragm caused by the pressure differential. In some examples, the loudspeaker may be turned off. In various examples, an isolation valve may be actuated to isolate the interior and exterior pressures so that the loudspeaker is protected from exposure to the pressure differential. In various examples, any combination of mitigating actions may be taken, and in some cases one or more mitigating actions may be taken in succession, e.g., in response to a condition of increasing pressure differential. For example, as a pressure differential or condition is detected, the response of the loudspeaker may be adjusted through signal processing, but if the pressure differential continues to increase, a threshold condition may be reached whereby a controller turns off the audio signal provided to the loudspeaker and/or actuates an isolation valve to reduce or remove the pressure differential.

In various examples, an isolation valve may be any acceptable type of isolation valve. Non-limiting examples may include a butterfly valve, gate valve, ball valve, aperture valve, or other suitable valve to reduce or isolate pressure continuity between differing regions or spaces, e.g., on either side of the valve.

Further, in some examples, an accommodation to prevent pressure from being trapped in the acoustic conduit may be provided. For example, a pressure relief valve and/or an engineered leak, e.g., a small opening to allow a slow exchange of air, may allow pressure in the acoustic conduit to equalize with a pressure outside the acoustic conduit. Such a pressure equalization component may be configured to equalize pressure on one side of the loudspeaker with pressure on another side of the loudspeaker, while the isolation valve maintains a pressure differential boundary between the pressure inside the acoustic conduit and an external pressure. Accordingly, the isolation valve is subjected to the pressure differential and the loudspeaker is not, such that a bias excursion of the loudspeaker due to pressure is prevented or remedied.

In various examples, a loudspeaker system for use in a vehicle with inside surfaces that enclose a passenger compartment or cabin includes an automotive loudspeaker assembly having a loudspeaker and at least one conduit having a proximal portion and a distal portion. The loudspeaker has a vibrating surface for generating sound pressure waves in response to, e.g., electrical stimulation. The proximal portion of the elongated conduit is open to one side of the loudspeaker vibrating surface. An opposing loudspeaker vibrating surface (the side not open to the elongated conduit) is either open to the passenger compartment or open to a space external to the passenger compartment. The distal portion of the elongated conduit can be either open to the passenger compartment or open to a space external to the passenger compartment.

In some implementations, an automotive loudspeaker assembly comprises a loudspeaker (an acoustic driver) with a radiating diaphragm or surface, an actuator for causing acoustic vibration of the radiating surface (such as a motor), and a conduit mounted on the 'front' or 'rear' of the loudspeaker. In various examples, one side of the loudspeaker diaphragm communicates with the passenger compartment or cabin of an automobile while the other side of the diaphragm communicates with an acoustic space outside of the cabin. The conduit couples one side of the diaphragm to either the cabin or the outside space. In various examples, the conduit can be located within the cabin, external to the cabin, or partially within and partially external to the cabin. In various examples, a boundary or partition that divides and defines the interior from the exterior of the cabin may be an inside surface of the vehicle body or may be any suitable boundary or partition.

FIG. 1A illustrates a loudspeaker assembly 100 formed of an acoustic conduit 110 and a loudspeaker 120. The acoustic conduit 110 includes a proximal end 112, an internal volume 114, and a distal end 116. The loudspeaker 120 may be mounted at the proximal end 112 such that at least a portion of a radiating surface of the loudspeaker 120 is acoustically coupled to the interior volume 114. The distal end 116 includes a mouth or opening 118. Accordingly, when installed or in use, the acoustic conduit 110 may form an acoustic coupler having a closed end formed of the loudspeaker 120 mounted at the proximal end 112 and an open end formed by the mouth 118 at the distal end.

In various examples, the acoustic conduit 110 is configured to be mounted or physically coupled to a vehicle having a partition or boundary 130 that divides and defines a first region 140 from a second region 150. In various examples, the first region 140 may be a cabin or other interior of the vehicle and the second region 150 may be outside of the cabin or exterior (or a space coupled to the exterior) of the vehicle. In other examples, the first region 140 may be the outside or exterior, and the second region 150 may be the interior. At least a portion of radiating surface of the loudspeaker 120 (a portion that isn't acoustically coupled to the interior volume 114) may be acoustically coupled to the first region 140. The mouth 118 of the distal end 116 may be acoustically coupled to the second region 150. Accordingly, the interior volume 114 forms an acoustic coupler to acoustically couple the loudspeaker 120 to the second region 150.

Figure 1B:
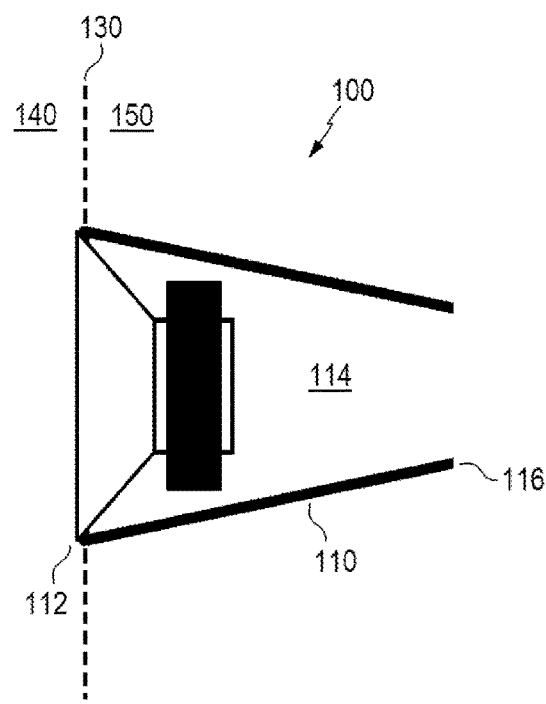
Figure 1C:
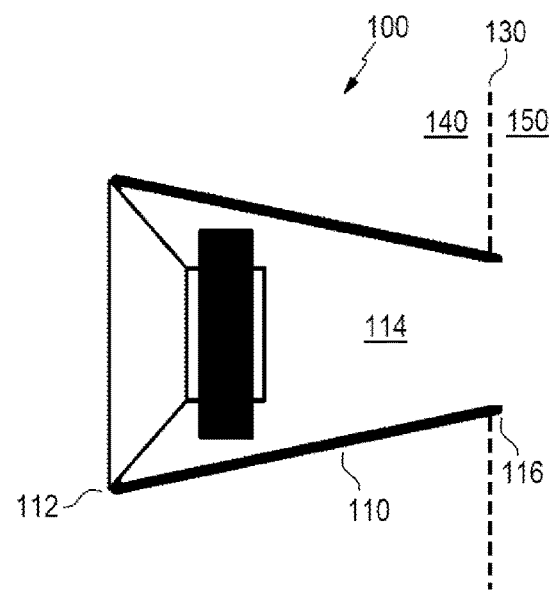

In various examples, the acoustic conduit 110 may be physically coupled to the vehicle in various manners and may be positioned in relation to the boundary 130 such that the acoustic conduit 110 may be partially in each of the first and second regions 140, 150, e.g., as illustrated in FIG. 1A, or may be substantially in either of the first region 140, e.g., as illustrated in FIG. 1B, or the second region 150, e.g., as illustrated in FIG. 1C.

Figure 2A:
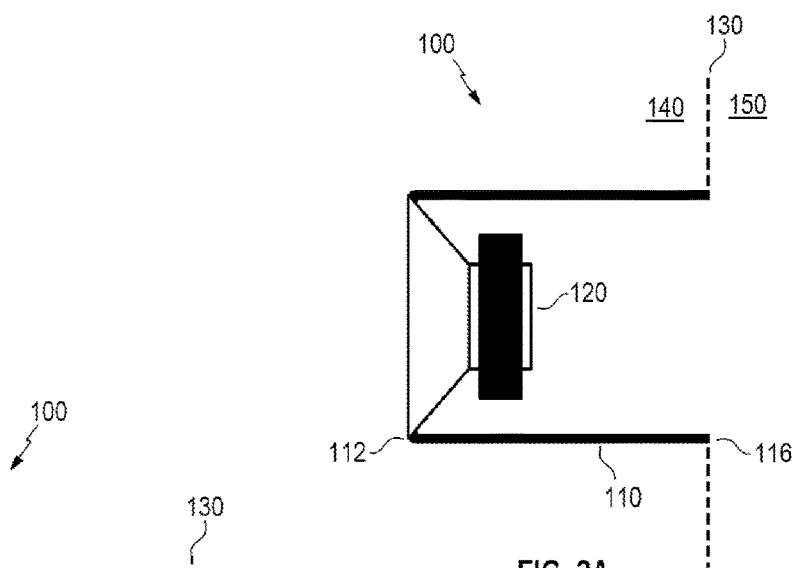
FIGS. 2A-2C are schematic diagrams of various other example loudspeaker assemblies.
Figure 2B:
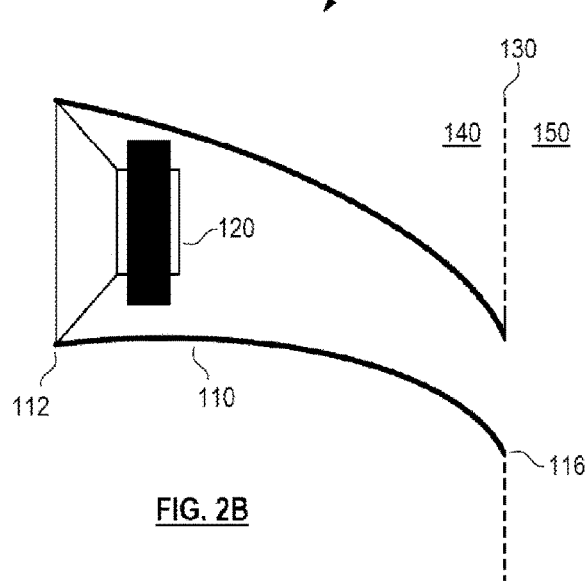
Figure 2C:
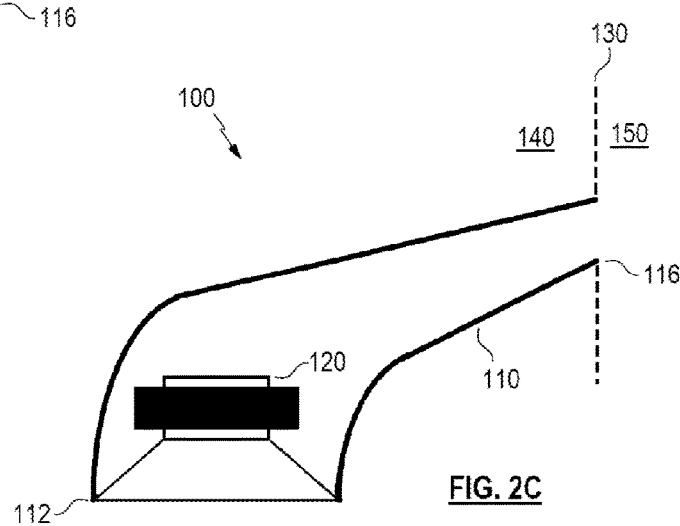
Figure 3A:
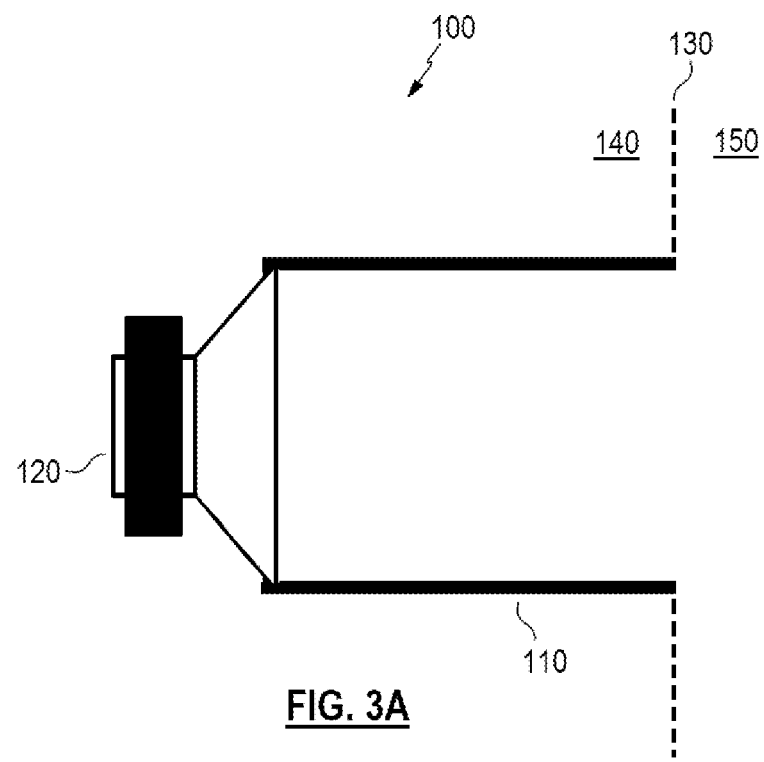
FIGS. 3A-3B are schematic diagrams of example loudspeaker assemblies having an alternate loudspeaker orientation.
Figure 3B:
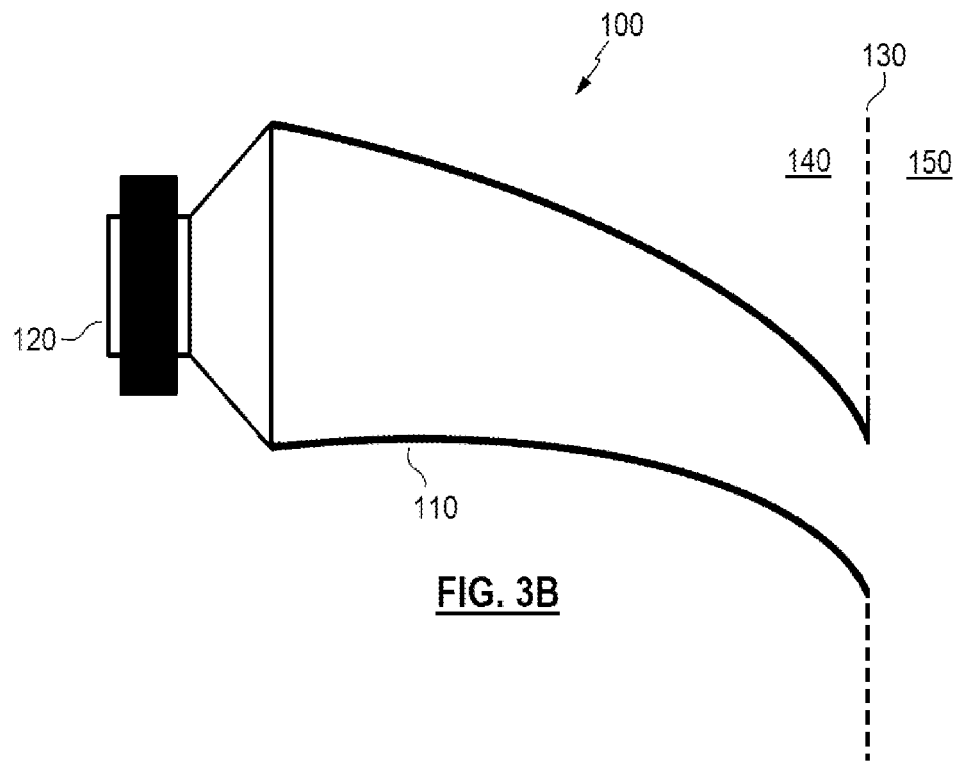

An acoustic conduit that forms a waveguide in accord with aspects and examples herein may have any of various shapes, at least on example of which is illustrated by FIGS. 1A-1C. Various further non-limiting examples are illustrated in FIGS. 2A-2C. Additionally, while each of FIGS. 1A-1C and 2A-2C are shown with the loudspeaker 120 coupled to the proximal end 112 in a particular orientation, in various examples the loudspeaker 120 may be coupled (or mounted) to the proximal end 112 in various ways and orientations, as illustrated, for example, in FIGS. 3A-3B.

Figure 4A:
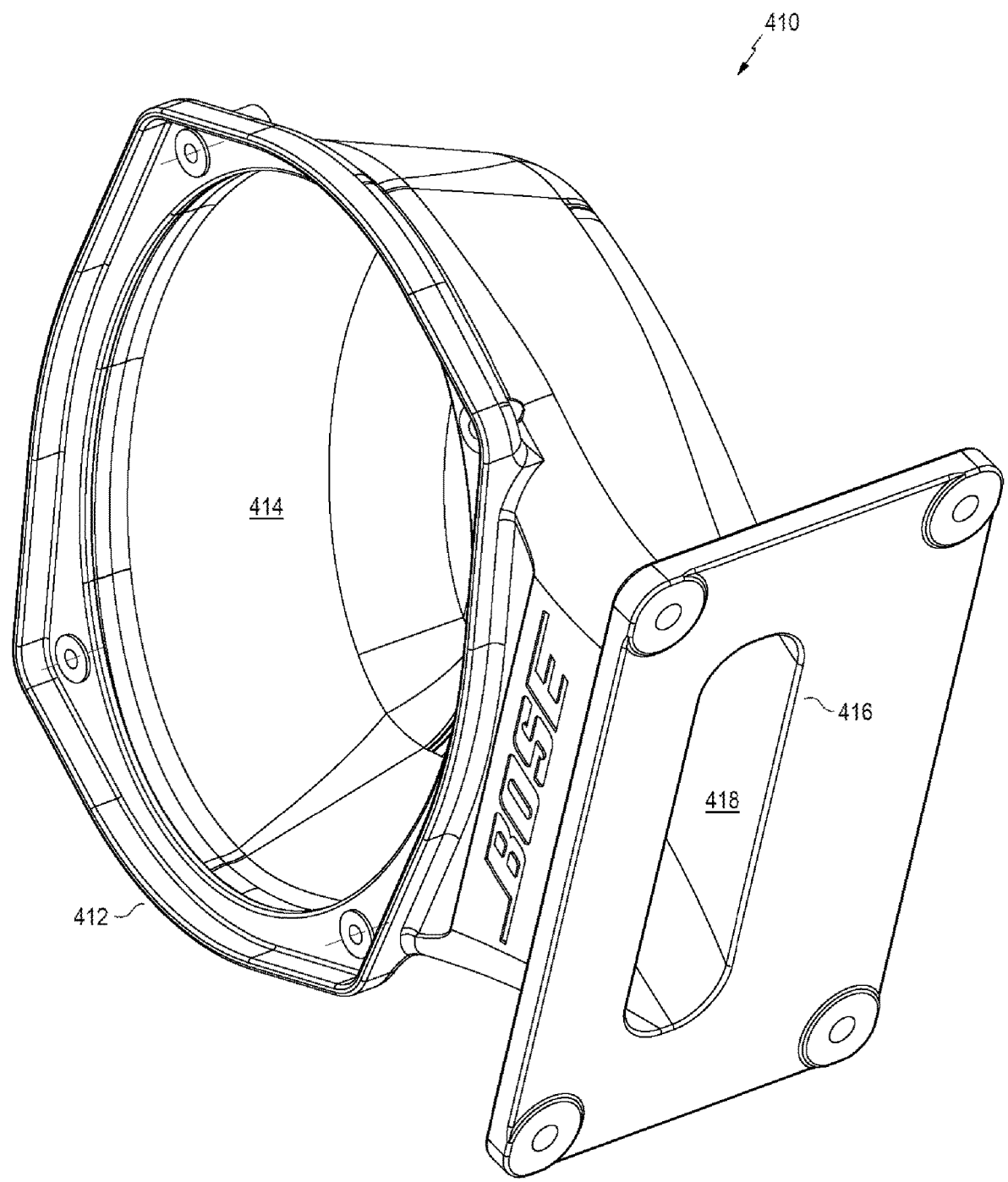
FIGS. 4A-4C are schematic diagrams of an example acoustic conduit for use in a loudspeaker assembly.
Figure 4B:
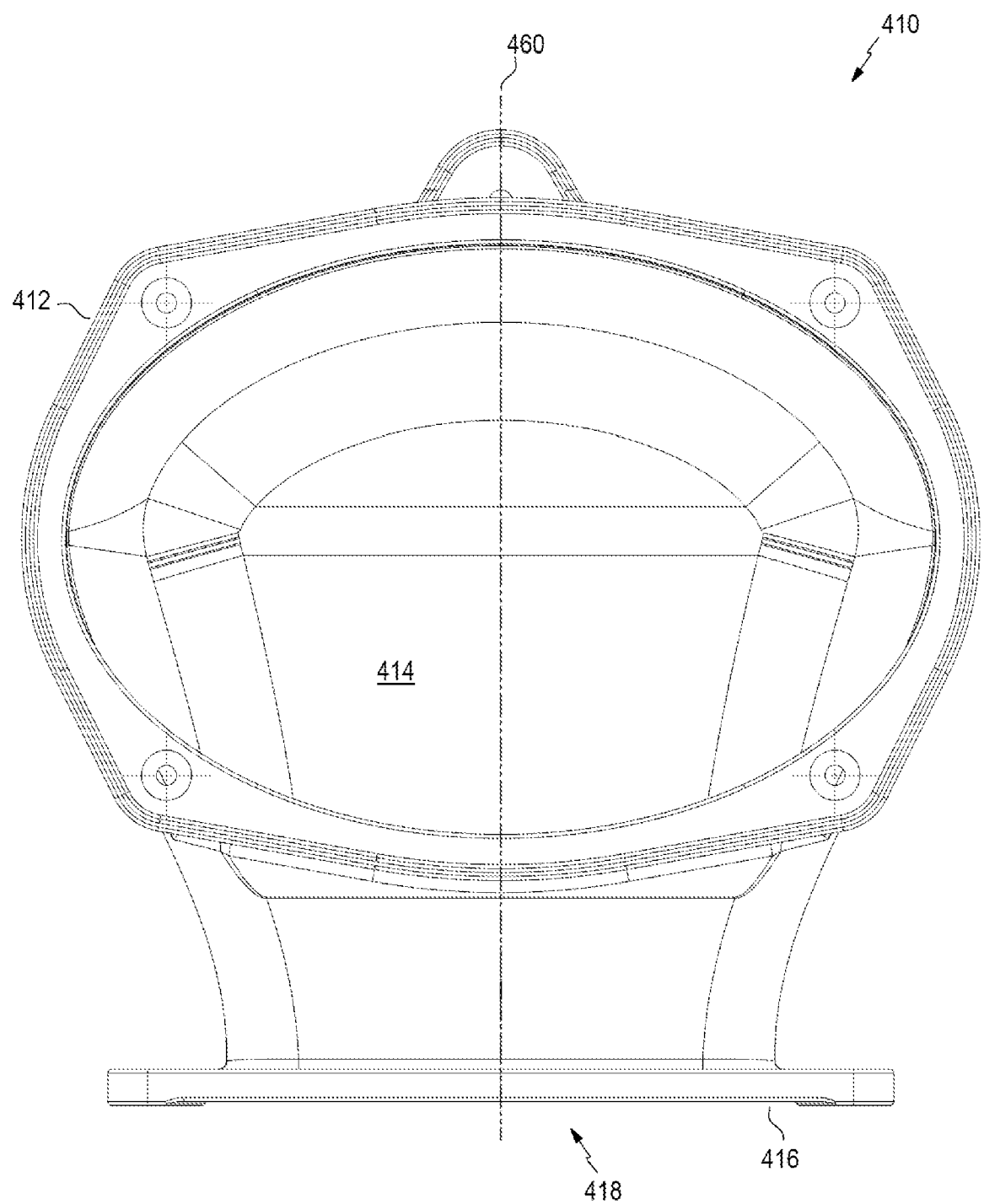
Figure 4C:
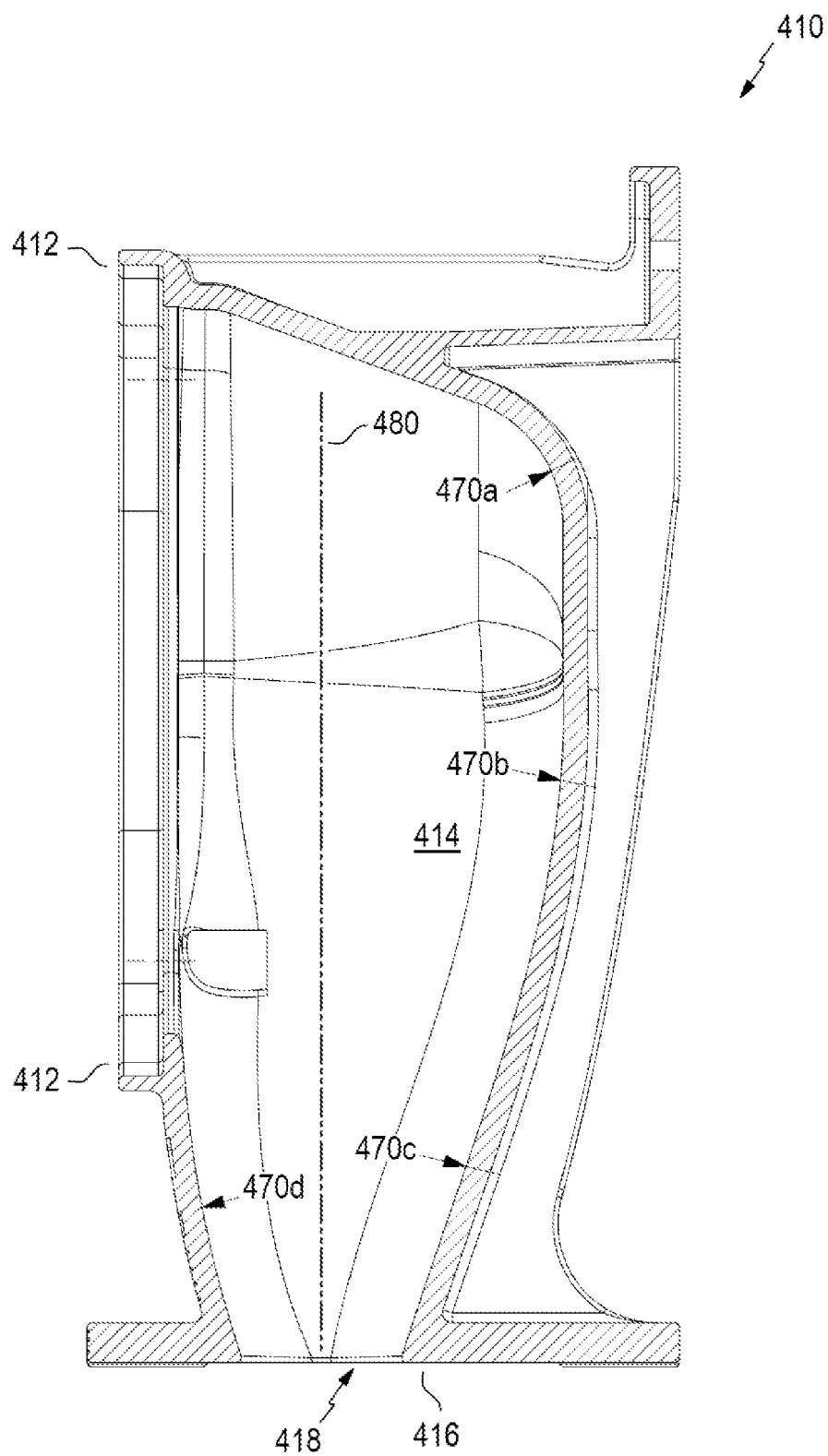

FIGS. 4A-4C illustrate perspective, "front," and "side" views, respectively, of an example acoustic conduit 410 that may be used as the acoustic conduit 110 of a loudspeaker assembly 100 as variously illustrated above. Similar to the acoustic conduit(s) 110 illustrated above, the acoustic conduit 410 includes a proximal end 412, an interior volume 414, and a distal end 416. The distal end 416 includes a mouth 418. According to the example acoustic conduit 410, the distal end 416 also forms a flange for mounting or physically affixing the acoustic conduit 410 to, e.g., a vehicle partition. The proximal end 412 is configured to accommodate a loudspeaker, such as a 6"×9" loudspeaker in some examples, but may accommodate any of various loudspeaker sizes and/or form factors as known in the art, in other examples. FIG. 4B further illustrates a centerline 460. FIG. 4C further illustrates a number of curvatures 470 of an interior surface and a reference axis 480. The structure illustrated in FIGS. 4A-4C is merely one non-limiting example of a suitable acoustic conduit.

In accord with various examples herein, an acoustic transducer, driver, or loudspeaker, may be any of many types of transducers known in the art. For example, an acoustic diaphragm coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer and/or may be coupled to an acoustic diaphragm or other radiating structure. In various examples, acoustic transducers may take other forms.

As illustrated in the various figures, an acoustic conduit 110, 410 is configured to acoustically couple a loudspeaker 120 to a first region 140 and a second region 150, such that at least a portion of acoustic energy radiated by the loudspeaker 120 is coupled to the first region 140 and another portion of acoustic energy radiated by the loudspeaker 120 is coupled to the second region 150. In various examples, and when installed in a vehicle, at least one of the first region 140 or the second region 150 is coupled to the interior cabin of the vehicle, while the other of the first region 140 or the second region 150 is coupled to an exterior. Accordingly, if a pressure differential exists between the interior and the exterior, the loudspeaker 120 may be exposed to the pressure differential, which may cause undesired acoustic performance, e.g., acoustic response, of the loudspeaker 120, or damage to the loudspeaker 120, or both.

In various examples, a controller may detect the pressure differential, or may detect vehicle operating conditions that give rise to a pressure differential, and may implement mitigating actions in response thereto. In some examples, the controller may control an audio system to cause the audio system to partially compensate for an undesired acoustic response, such as by applying filtering, gains, parametric equalization (EQ), etc., which may also include making similar changes to other loudspeakers of the audio system, to maintain an overall acceptable acoustic response.

In some examples, or in response to more extreme pressure differential situations, the controller may control the audio system to disable or turn-off the loudspeaker 120, such as by removing an audio signal provided to the loudspeaker 120. In some examples, the audio system may adjust signal processing to other loudspeakers to at least partially compensate for the loss of acoustic output from the loudspeaker 120.

Figure 5:
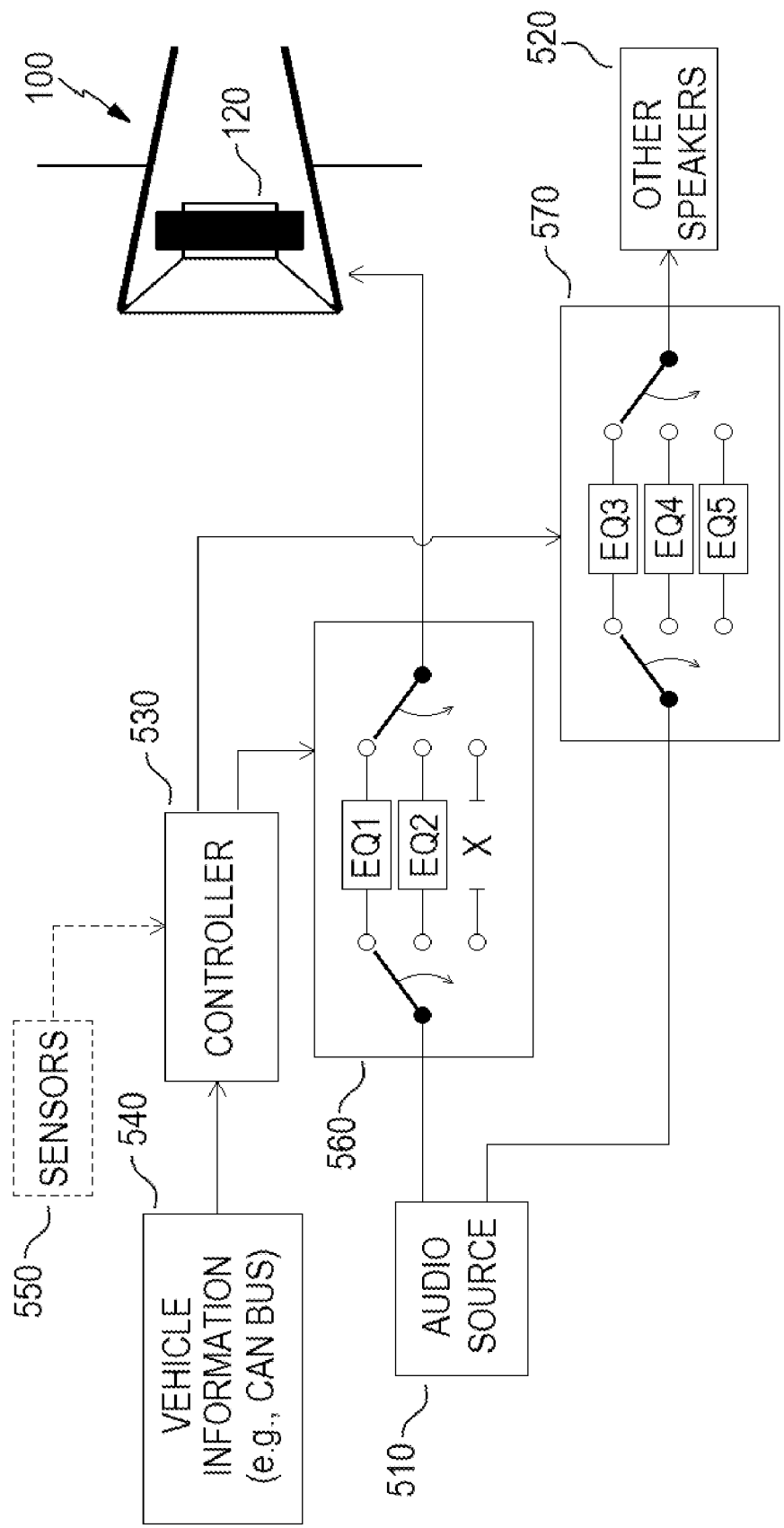
FIG. 5 is a schematic diagram of an example control system.

FIG. 5 illustrates an example of a control system, which may be coupled to an audio system, or for which portions may be part of an audio system. An audio source 510 provides audio signals to the loudspeaker 120 and to other speakers 520. A controller 530 may be configured to control various adjustments to the audio signals and/or operating parameters of the audio system based upon a determination that a pressure differential exists and/or might exist or develop. The controller 530 may receive various information, such as vehicle information 540, e.g., from a controller area network (CAN) of the vehicle, or sensor information from sensors 550, or any combination of vehicle and sensor information, from which the controller 530 determines whether a pressure differential is present and/or whether conditions exist that might lead to a pressure differential. For instance, a high vehicle speed in combination with a cabin opening, such as an open window, sunroof, etc., may be detected from vehicle information 540 and/or a sensor 550.

In some examples, the controller 530 may be configured to adjust the audio signal provided to the loudspeaker 120 under certain vehicle conditions. As illustrated schematically in FIG. 5, the controller 530 may apply an audio control 560 to, e.g., switch an equalization of the audio signal provided to the loudspeaker 120. Under different vehicle conditions, the controller 530 may be configured to disable the audio signal to the loudspeaker 120, e.g., to turn off the loudspeaker 120.

For example, the controller 530 may be configured to change equalization when a window is open and the vehicle speed reaches a first threshold, the combination of which may be known a priori to cause a mild pressure differential at the loudspeaker 120, and that such mild pressure differential causes a change in acoustic response of the loudspeaker 120, and the changed equalization may be selected to mitigate the changed acoustic response. If the vehicle speed reaches a second threshold, it may be known a priori that such may cause a high pressure differential, and the controller 530 may be configured to disable the loudspeaker 120. In various examples, disabling the loudspeaker 120 may be preferable when, for instance, the changed acoustic response is so significant that it cannot be mitigated by equalization and/or to prevent damage to the loudspeaker 120.

In various examples, the controller 530 may also adjust audio signal(s) to other speakers 520 in combination with adjusting the audio signal to the loudspeaker 120. For instance, changing the equalization to the loudspeaker 120 may necessitate a corresponding change in equalization to the other speakers 520, e.g., to maintain an acceptable overall acoustic performance and/or tuning of the audio system. Further, if the loudspeaker 120 is disabled (turned off), such may necessitate a further change in equalization to the other speakers 520, to maintain acceptable performance of the audio system overall.

According to various examples, the controller 530 may detect or determine that a pressure differential exists, or that a pressure differential is likely to exist, or that a pressure differential is likely to develop. In some examples the controller 530 may directly detect a pressure differential, e.g., via one or more pressure sensors which may be an example of a sensor 550. In other examples, various operating conditions of the vehicle may be known to cause pressure differentials and/or likely to establish conditions under which a pressure differential may develop, as may be determined by empirical testing, for instance. Accordingly, the controller 530 may monitor conditions of the vehicle operation, via one or more sensors 550 and/or from vehicle information 540, and may detect or determine a condition that may cause damage to or altered performance of the loudspeaker 120, such as a pressure differential, and in response to the condition may alter an audio signal provided to the loudspeaker 120, such as by changing an equalization or otherwise altering an acoustic response of the loudspeaker 120. Altering the audio signal may include turning off the audio signal or otherwise de-activating the loudspeaker 120, in some examples.

Figure 6B:
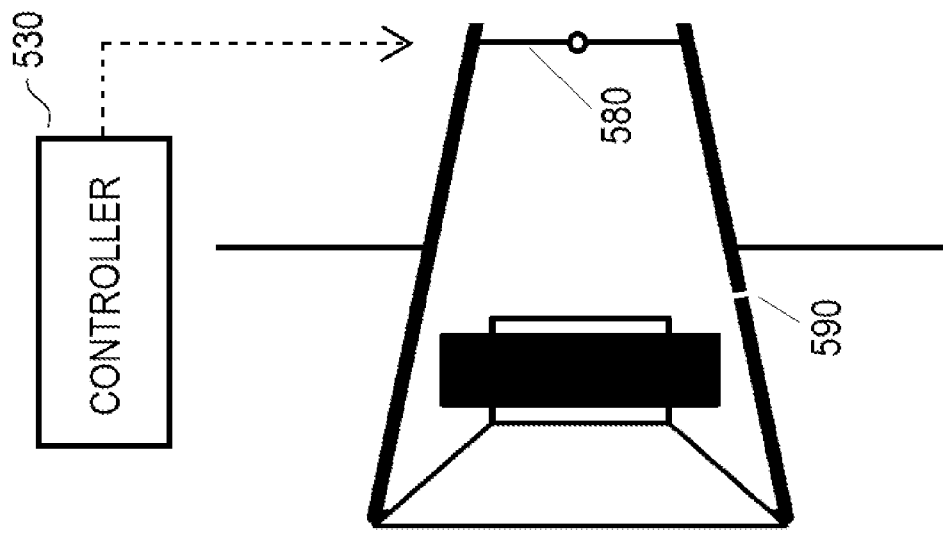
FIGS. 6A-6B are schematic diagrams illustrating an example isolation valve that protects the loudspeaker from a pressure differential.
Figure 6A:
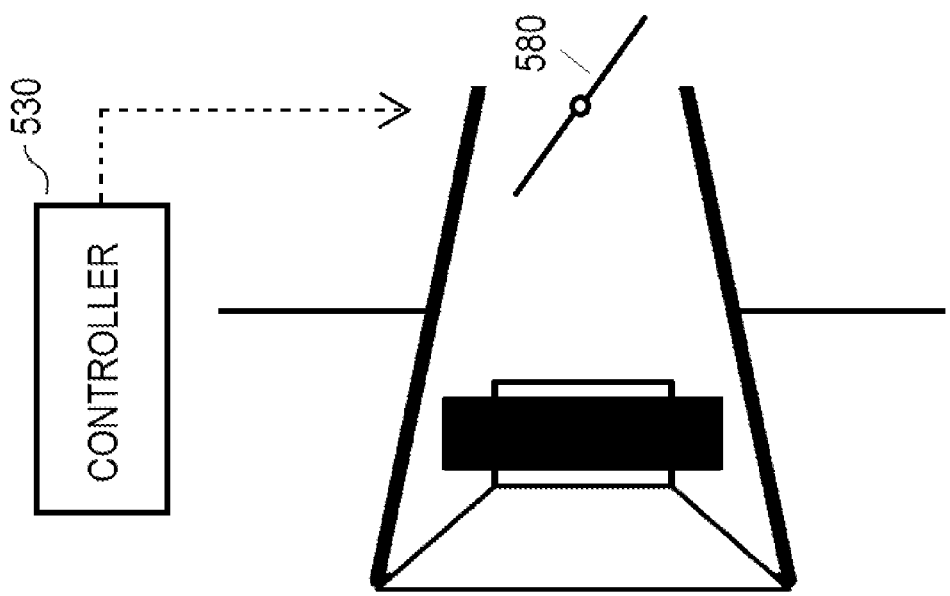

Further in some examples, and with reference to FIGS. 6A-6B, an isolation valve 580 may be provided. In response to detecting the condition, such as a pressure differential, or certain levels of pressure differential, the controller 530 may actuate the isolation valve to "close" and thereby reduce or remove the pressure differential to which the loudspeaker 120 is exposed. Various examples may include an actuator that responds to control signals form the controller 530 to actuate the isolation valve. FIG. 6A illustrates one example of an isolation valve 580, e.g., a butterfly valve, in a partially "open" position whereby the loudspeaker 120 is acoustically coupled to the second region 150 and is exposed to any pressure differential, if one exists, between the first region 140 and the second region 150. FIG. 6B illustrates an example of the isolation valve 580 in a "closed" or actuated state. In certain examples, the controller 530 may adjust the audio signal in combination with actuating the isolation valve. For example, a lower total signal power may be provided to the loudspeaker 120 when the isolation valve 580 is closed, or the loudspeaker 120 may be disabled, e.g., the audio signal disconnected from the loudspeaker 120, when the isolation valve 580 is closed.

In various examples and/or under various conditions, a transition of the isolation valve 580 from the "open" to the "closed" position may effectively trap a pressure in the interior volume of the acoustic conduit. Accordingly, various examples may include a pressure equalization component 590, which may be a pressure relief valve that may be actuated by the controller 530 or by a pressure differential. In other examples, and as illustrated in FIG. 6B, the pressure equalization component 590 may be an engineered leak, such as a small vent hole in a structural boundary of the acoustic conduit, that allows a pressure equalization to occur between the two sides of the loudspeaker 120. In various examples, the pressure equalization component 590 may take other forms. In various examples, the pressure equalization component 590 may be configured to have limited acoustic effects with respect to the operation of the loudspeaker 120 and the acoustic conduit.

Examples of the methods and apparatuses discussed herein are not limited in application to the details of construction and the arrangement of components set forth in the description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A vehicle audio system, comprising:
   a loudspeaker configured to be acoustically coupled to an interior of a vehicle and to be ducted to an exterior of the vehicle; and
   a controller coupled to the loudspeaker and configured to (i) detect one or more vehicle operating parameters of the vehicle that would result in a pressure differential condition between the interior and the exterior, and (ii) adjust an audio signal provided to the loudspeaker in response to detecting the vehicle operating parameters.

2. The vehicle audio system of claim 1, wherein the vehicle operating parameters of the vehicle comprise at least one of a vehicle speed and an open or closed state of a vehicle port.

3. The vehicle audio system of claim 2, wherein the vehicle port is a sunroof or window of the vehicle.

4. The vehicle audio system of claim 1 further comprising a sensor that detects the vehicle operating parameters of the vehicle.

5. The vehicle audio system of claim 1, wherein adjusting the audio signal comprises applying an equalization (EQ) to the audio signal or changing the equalization (EQ) of the audio signal.

6. The vehicle audio system of claim 1, wherein adjusting the audio signal comprises reducing an amplitude of the audio signal.

7. The vehicle audio system of claim 1, wherein adjusting the audio signal comprises deactivating the loudspeaker.

8. The vehicle audio system of claim 7, further comprising a second loudspeaker, wherein the controller is further configured to adjust signal processing to said second loudspeaker to at least partially compensate for the loss of acoustic output from the deactivated loudspeaker.

9. The vehicle audio system of claim 1, wherein the controller is configured to receive the one or more vehicle operating parameters of the vehicle from a controller area network (CAN) of the vehicle.

10. The vehicle audio system of claim 1, wherein the controller is configured to adjust the audio signal by changing an equalization of the audio signal when a port of the vehicle is open and the vehicle speed reaches a first threshold.

11. The vehicle audio system of claim 10, wherein the controller is configured to deactivate the loudspeaker when the port of the vehicle is open and the vehicle speed reaches a second threshold that is higher than the first threshold.

12. The vehicle audio system of claim 1, further comprising a second loudspeaker, wherein the controller is further configured to adjust signal processing to said second loudspeaker.

13. The vehicle audio system of claim 1, wherein adjustment of the audio signal counters a change in acoustic response of the loudspeaker caused by the pressure differential condition.

14. The vehicle audio system of claim 1, wherein adjustment of the audio signal counters a change in acoustic response of the loudspeaker caused by the pressure differential condition without either reducing or removing the pressure differential.

15. The vehicle audio system of claim 1, wherein the controller does not actuate an isolation valve in response to detecting the vehicle operating parameters.

16. A vehicle comprising the vehicle audio system of claim 1.

17. The vehicle audio system of claim 1, wherein adjusting the audio signal comprises adding a direct current bias to the signal in order to counteract a bias deflection of a diaphragm of the loudspeaker caused by the pressure differential condition.

18. The vehicle audio system of claim 1, wherein, if the pressure differential condition remains after adjustment of the audio signal, the controller is configured to take additional and successive mitigating actions in order to address the pressure differential condition.

* * * * *